United States Patent Office 3,352,891
Patented Nov. 14, 1967

3,352,891
19-NORSTEROIDAL-17-NITRATES
Gerhard R. Wendt, Havertown, and Kurt W. Ledig, Philadelphia, Pa., assignors to American Home Products Corporation, New York, N.Y., a corporation of Delaware
No Drawing. Filed Feb. 11, 1966, Ser. No. 526,716
10 Claims. (Cl. 260—397.4)

This invention relates to new and useful nitrates of 13-alkyl-17β-hydroxy-gon-4-en-3-ones having pharmacodynamic activity.

The novel compounds which are included within the scope of this invention are represented by the following formula

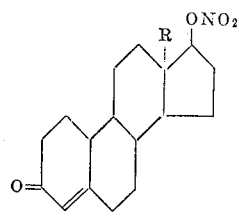

wherein R is lower alkyl. Examples of such compounds include *l*-17β-hydroxyestr-4-en-3-one, nitrate; *d*-17β-hydroxyestr-4-en-3-one, nitrate; and *dl*-13-ethyl-17β-hydroxy-gon-4-en-3-one, nitrate.

The novel nitrates of the present invention may be prepared by the reaction of an appropriate 13-alkyl-17β-hydroxy-gon-4-en-3-one, as a racemic mixture or as one of the component enantiomorphs, with a nitric acid-acetic anhydride mixture at temperatures below 0° C. When the reaction is complete, the excess acid is neutralized by the addition of an alkaline reagent such as the hydroxide, carbonate or bicarbonate of an alkali metal or alkaline earth metal salt. The 19-nor-steroidal nitrate is then separated and purified by conventional methods, such as, extraction and crystallization.

Many of the 19-nor-steroids employed as reactants in the above reaction are known compounds which are available from commercial sources, while the remainder can be prepared by the procedure described by H. Smith et al. in J. Chem. Soc. p. 4472 (1964). The *l*-estradiol-3-methyl ether starting material of hereinafter Example I is prepared by the procedure described in the copending application, U.S. Ser. No. 526,851, entitled "Chemical Resolution of gona-1,3,5(10),8,14-pentaen-17-ols," filed on Feb. 11, 1966.

In accord with the present invention, the new 19-nor-steroidal nitrates herein described have been found to possess interesting pharmaceutical properties which render them useful as synthetic medicinals. More particularly, these nitrates, in standard pharmacological tests, have exhibited utility as vasodilators, lowering the arterial pressure by the dilation of the blood vessels.

When the 19-norsteroidal nitrates of this invention are employed as vasodilators, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 20.0 mg. per kg. of body weight per day, although as aforementioned variations will occur. However, a dosage level that is in the range of from about 0.5 mg. to about 10 mg. per kg. of body weight per day is most desirably employed in order to achieve effective results.

The following examples are given by way of illustration and are not to be construed as limitations of this invention, many variations of which are possible without departing from the scope and spirit thereof.

*Example I*

A solution of 250 ml. of 1,2-dimethoxyethane, 250 ml. of tetrahydrofuran, 250 ml. of 1-methoxy-2-propanol, 1.1 liters of ammonia, and 4.2 g. of *l*-estradiol-3-methyl ether is treated with 4.2 g. of lithium. After the blue color disappears, the reaction mixture is treated with water and the crude (4.2 g.) *l*-3-methoxyestra-2,5-(10)-dien-17β-ol collected.

A suspension of 120 ml. of methanol, 6 ml. of water, 8 ml. of conc. hydrochloric acid and 4.2 g. of above prepared *l*-3-methoxyestra-2,5(10)-dien-17β-ol is stirred for 1 hour. The clear resulting solution is diluted with water and material collected with ether to give after crystallization from ether/hexane, 1.4 g. of produce, M.P. 121.5–122.5° C. After recrystallization from ether/hexane there is obtained *l*-17β-hydroxyester-4-en-3-one, M.P. 123.5–125° C., $[\alpha]_D^{25}$ −57.6 (CHCl$_3$); U.V. 241.5 m$\mu$ ($\epsilon$16,740).

Analysis.—for C$_{18}$H$_{26}$O$_2$, Calcd.: C, 78.79; H, 9.55. Found: C, 78.66; H, 9.25.

Acetic anhydride (9.4 ml.) is cooled to −15° C. and nitric acid (3.1 ml. of 95%) added dropwise at such a rate that the temperature did not exceed −6° C. The solution is cooled to −10° C. and 1.3 g. of *l*-17β-hydroxyestr-4-ene-3-one is added with stirring. After 30 minutes, the reaction mixture is poured into ice-water, neutralized to pH 6 with sodium bicarbonate and the material extracted with ether. The organic layer is concentrated and the resulting crystalline material collected by filtration. In this manner, is obtained *l*-17β-hydroxyestr-4-en-3-one, nitrate, M.P. 108–110° C.

Analysis.—for C$_{18}$H$_{25}$NO$_4$, Calcd.: C, 67.69; H, 7.89; N, 4.39. Found: C, 67.72; H, 7.88; N, 4.17.

*Example II*

To a mixture of 19 ml. of acetic anhydride and 6.5 ml. of conc. nitric acid at −10° C., there is added with stirring 2.6 g. of *l*-13-ethyl-17β-hydroxygon-4-en-3-one. After stirring for one-half hour, the reaction mixture is poured into ice-water, neutralized with sodium hydroxide and extracted with ether. Upon evaporation, there is obtained *l*-13-ethyl-17β-hydroxygon-4-en-3-one nitrate.

Similarly, the nitrate of *l*-17β-hydroxy-13-propylgon-4-en-3-one is produced.

*Example III*

Nitric acid (6.2 ml., 95%) is slowly added to 18.8 ml. of acetic anhydride at −25° C. Subsequently, 2.6 g. of *d*-17β-hydroxyestr-4-en-3-one is added at −200 C. and the stirring reaction mixture is then gradually warmed to +2° C. within 20 minutes. The mixture is then poured over ice, neutralized with sodium bicarbonate and collected in either. The ether is concentrated and the crystalline residue is *d*-17β-hydroxyestr-4-en-3-one, nitrate, M.P. 109–110° C., IR, $\lambda_{max}^{KBr}$ 6.00 (conj. ketone); 6.20 (R–O–NO$_2$)μ

*Analysis.*—for $C_{18}H_{25}NO_4$; Calcd.: C. 67.69; H, 7.89; N, 4.39. Found: C, 67.42; H, 7.82; N, 4.43.

In a similar manner, *d*-13-ethyl-17β-hydroxygon-4-en-3-one, nitrate and *d*-17β-hydroxy-13-propylgon-4-en-3-one, nitrate are obtained.

*Example IV*

To a solution of 21.7 ml. of acetic anhydride and 7.2 ml. of fuming nitric acid (95%) at −40° C., there is added with stirring 3.0 g. of *dl*-13-ethyl-17β-hydroxygon-4-en-3-one and the reaction mixture brought to 18° C. within a 25 min. period. The reaction mixture is poured into ice water, neutralized with sodium bicarbonate, extracted with chloroform and the combined extracts washed with 10% sodium carbonate. Evaporation of the solvent followed by recrystallization from ethyl acetate yields 2.3 g. of *dl*-13-ethyl-17β-hydroxygon-4-en-3-one, nitrate, M.P. 140–141° C., $\lambda_{max}^{KBr}$ 6.05 (vs, conjugated >C=O); 6.20 (vs, −ONO$_2$)μ

*Analysis.*—for $C_{19}H_{27}NO_4$, Calcd.: C, 68.44; H, 8.16; N, 4.20. Found: C, 68.16; H, 7.99; N, 4.27.

Similarly, *dl*-17β-hydroxy-13-propylgon-4-en-3-one, nitrate; *dl*-13-butyl-17β-hydroxygon-4-en-3-one, nitrate and *dl*-13-isobutyl-17β-hydroxygon-4-en-3-one, nitrate are produced.

What is claimed is:
1. A compound selected from the group consisting of those having the formula:

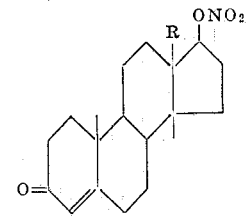

wherein R is lower alkyl.

2. A compound as described in claim 1 which is *l* - 17β-hydroxyestr - 4 - en - 3 - one, nitrate.
3. A compound as described in claim 1 which is *d* - 17β-hydroxyestr - 4 - en - 3 - one, nitrate.
4. A compound as described in claim 1 which is *dl* - 13-ethyl - 17β - hydroxygon - 4 - en - 3 - one, nitrate.
5. A compound as described in claim 1 which is *dl*-17β - hydroxy - 13 - propylgon - 4 - en - 3 - one, nitrate.
6. A compound as described in claim 1 which is *l* - 13-ethyl - 17β - hydroxygon - 4 - en - 3 - one, nitrate.
7. A compound as described in claim 1 which is *d* - 13-ethyl - 17β - hydroxygon - 4 - en - 3 - one, nitrate.
8. A compound as described in claim 1 which is *dl*-13 - butyl - 17β - hydroxygon - 4 - en - 3 - one, nitrate.
9. A compound as described in claim 1 which is *dl*-13 - isobutyl - 17β - hydroxygon - 4 - en - 3 - one, nitrate.
10. A compound as described in claim 1 which is *l*-17β - hydroxy - 13 - propylgon - 4 - en - 3 - one, nitrate.

References Cited

UNITED STATES PATENTS 3,138,620   6/1964   Tadanier _____ 260—397.3

OTHER REFERENCES

Legrand et al.: Compt. Rend. Acad. Sci., 255, pages 2985 and 2986 (1962).

LEWIS GOTTS, *Primary Examiner.*

T. M. MESHBESHER, *Assistant Examiner.*